United States Patent
Watanabe

(10) Patent No.: US 8,836,694 B2
(45) Date of Patent: Sep. 16, 2014

(54) TERMINAL DEVICE INCLUDING A THREE-DIMENSIONAL CAPABLE DISPLAY

(75) Inventor: Akira Watanabe, Hanno (JP)

(73) Assignee: NEC Corporation, Tokyo (JP)

( * ) Notice: Subject to any disclaimer, the term of this patent is extended or adjusted under 35 U.S.C. 154(b) by 649 days.

(21) Appl. No.: 12/761,322

(22) Filed: Apr. 15, 2010

(65) Prior Publication Data

US 2010/0309202 A1 Dec. 9, 2010

(30) Foreign Application Priority Data

Jun. 8, 2009 (JP) ................................ 2009-136913

(51) Int. Cl.
 *G06T 15/00* (2011.01)
 *H04N 13/04* (2006.01)

(52) U.S. Cl.
 CPC ....... *H04N 13/0454* (2013.01); *H04N 13/0497* (2013.01)
 USPC ............................... 345/419; 348/42; 348/43

(58) Field of Classification Search
 CPC ................................ H04N 13/00; H04N 5/00
 USPC ......................................................... 345/419
 See application file for complete search history.

(56) References Cited

U.S. PATENT DOCUMENTS

| | | | |
|---|---|---|---|
| 6,285,368 B1 * | 9/2001 | Sudo | 345/419 |
| 2007/0005653 A1 * | 1/2007 | Marsh | 707/104.1 |
| 2008/0074424 A1 * | 3/2008 | Carignano | 345/473 |
| 2008/0215577 A1 * | 9/2008 | Takagi | 707/5 |
| 2009/0011751 A1 | 1/2009 | Goto | |
| 2009/0315980 A1 * | 12/2009 | Jung et al. | 348/43 |
| 2010/0156897 A1 * | 6/2010 | Blumenthal et al. | 345/419 |
| 2010/0289871 A1 * | 11/2010 | Tatsuta et al. | 348/42 |

FOREIGN PATENT DOCUMENTS

| | | |
|---|---|---|
| JP | 2006-121553 | 5/2006 |
| JP | 2007-187823 | 7/2007 |
| JP | 4297508 | 7/2009 |

\* cited by examiner

*Primary Examiner* — Ke Xiao
*Assistant Examiner* — Weiming He
(74) *Attorney, Agent, or Firm* — Cozen O'Connor

(57) ABSTRACT

In a mobile phone, a display section capable of 3D display, which includes a high-definition liquid crystal, has a liquid crystal layer for generating a parallax barrier on the front surface thereof. A central controlling section judges suitability in 3D display of content based on the contents of the content before displaying the content in the display section, and displays the content in 3D when the content is judged to be suitable for 3D display.

16 Claims, 8 Drawing Sheets

DISPLAY CONTROL INFORMATION STORAGE SECTION M3

| SUITABILITY CONDITION | SETTING FLAG | DISPLAY CONTROL INFORMATION | |
|---|---|---|---|
| CONTENT TYPE | | 2D/3D | 3D DEPTH |
| ANIMATED PROGRAM | | 3D | LEVEL 2 |
| ACTION MOVIE | | 3D | LEVEL 3 |
| OTHER MOVIES | | 3D | LEVEL 1 |
| WEATHER FORECAST PROGRAM | 1 | 2D | LEVEL 0 |
| STOCK MARKET PROGRAM | | 2D | LEVEL 0 |
| GO/SHOGI PROGRAM | | 2D | LEVEL 0 |
| CM | | 2D | LEVEL 0 |
| ... | | | |
| KEYWORD | | 2D/3D | 3D DEPTH |
| SPORTS | | 3D | * * * |
| SOCCER | | 3D | LEVEL 3 |
| TABLE TENNIS | 0 | 3D | LEVEL 1 |
| SHOGI | | 2D | LEVEL 0 |
| MARTIAL ARTS | | 3D | LEVEL 3 |
| ... | | | |

DISPLAY CONTROL INFORMATION STORAGE SECTION

| SUITABILITY CONDITION | | SETTING FLAG | DISPLAY CONTROL INFORMATION | |
|---|---|---|---|---|
| CONTENT TYPE | | | 2D/3D | 3D DEPTH |
| | ANIMATED PROGRAM | | 3D | LEVEL 2 |
| | ACTION MOVIE | | 3D | LEVEL 3 |
| | OTHER MOVIES | | 3D | LEVEL 1 |
| | WEATHER FORECAST PROGRAM | 1 | 2D | LEVEL 0 |
| | STOCK MARKET PROGRAM | | 2D | LEVEL 0 |
| | GO/SHOGI PROGRAM | | 2D | LEVEL 0 |
| | CM | | 2D | LEVEL 0 |
| | ... | | | |
| KEYWORD | | | 2D/3D | 3D DEPTH |
| | SPORTS | | 3D | * * * |
| | SOCCER | | 3D | LEVEL 3 |
| | TABLE TENNIS | 0 | 3D | LEVEL 1 |
| | SHOGI | | 2D | LEVEL 0 |
| | MARTIAL ARTS | | 3D | LEVEL 3 |
| | ... | | | |

FIG. 5

DISPLAY CONTROL INFORMATION STORAGE SECTION M3

| SUITABILITY CONDITION | | SETTING FLAG | DISPLAY CONTROL INFORMATION | |
|---|---|---|---|---|
| ANALYSIS CRITERION | ANALYSIS RESULT | | 2D/3D | 3D DEPTH |
| LUMINOSITY | LOW VARIATION | 1 | 3D | LEVEL 3 |
| | MEDIUM VARIATION | | 3D | LEVEL 1 |
| | HIGH VARIATION | | 2D | LEVEL 0 |
| COLOR | LOW VARIATION | 0 | 2D | LEVEL 0 |
| | MEDIUM VARIATION | | 3D | LEVEL 1 |
| | HIGH VARIATION | | 3D | LEVEL 3 |
| MOVEMENT | ZERO MOVEMENT (STILL IMAGE) | | 2D | LEVEL 0 |
| | SLIGHT MOVEMENT (MOVING IMAGE) | | 3D | LEVEL 1 |
| | SUBSTANTIAL MOVEMENT (MOVING IMAGE) | | 3D | LEVEL 3 |

FIG. 7

CONTENT STORAGE SECTION  M4

| TITLE | TYPE | ACTUAL DATA | 3D DEPTH |
|---|---|---|---|
| 2D CODE | STILL IMAGE | 2D | LEVEL 0 |
| FIELD DAY 2008 | STILL IMAGE | 2D | LEVEL 0 |
| J-LEAGUE MATCH * * | MOVING IMAGE | 3D | LEVEL 1 |
| SAMPLE MOVING IMAGE * * | MOVING IMAGE | 3D | LEVEL 1 |
|  |  | 3D | LEVEL 2 |
| SAMPLE STILL IMAGE * * | STILL IMAGE | 3D | LEVEL 1 |
|  |  | 3D | LEVEL 2 |
|  |  | 3D | LEVEL 3 |
| .... |  |  |  |

TERMINAL DEVICE INCLUDING A THREE-DIMENSIONAL CAPABLE DISPLAY

CROSS-REFERENCE TO RELATED APPLICATION

This application is based upon and claims the benefit of priority from the prior Japanese Patent Application No. 2009-136913, filed Jun. 8, 2009, the entire contents of which is incorporated herein by reference.

BACKGROUND OF THE INVENTION

1. Field of the Invention

The present invention relates to terminal device and control program thereof for displaying display information in a display section capable of three-dimensional display.

2. Description of the Related Art

Conventionally, various techniques are used to three-dimensionally display (3D display) in a flat display section display information such as images (still images and moving images), text, and menus to enable users to stereoscopically view the display information. As a technique such as this, for example, a technique is known in which an object in two-dimensional (2D) display information can be viewed stereoscopically by a visual effect that makes the object appear three-dimensional being applied to the object.

A technique using a polygon is an example of this technique. A technique is also known that uses binocular disparity between the right eye and the left eye of the user. That is, in this technique, display information for the right eye and display information for the left eye that are slightly misaligned with each other are provided, and an electronic parallax barrier (switching liquid crystal panel) that blocks light paths is placed in an appropriate position such that, when these two display information are simultaneously shown, the display information for the right eye is visible to the right eye but not to the left eye, and the display information for the left eye is visible to the left eye but not to the right eye. As a result, the display information appears three-dimensional.

All 3D display techniques described above use a parameter referred to as 3D depth that indicates the depth of 3D or the extent of outward projection. The stronger the 3D depth the deeper or more outwardly projecting the display information appears to the user. On the other hand, the weaker the 3D depth the shallower or less outwardly projecting the display information appears. When the 3D depth is zero, the display information appears two-dimensional (in other words, 2D display).

A display system is conventionally known that uses an electronic parallax barrier to convert flat (2D)/three-dimensional (3D) images accordingly and display the converted images (refer to, for example, Japanese Patent Application Laid-Open (Kokai) Publication No. 2006-121553).

However, in the above-described conventional technology, there are problems in that, when the text contents such as text information are displayed in 3D, the strain on the eyes outweighs the original benefit of 3D display, and electrical power is needlessly consumed by the load of the 3D processing. These problems similarly apply to still image contents and moving image contents in addition to text contents, and there is a significant difference in the benefit of 3D display depending on the content to be displayed.

SUMMARY OF THE INVENTION

The present invention has been conceived to solve the above-described problems. An object of the present invention is to provide a terminal device that is capable of actualizing a suitable display in accordance with the contents of display information when the display information is displayed in a display section capable of 3D display.

In order to achieve the above-described object, in accordance with one aspect of the present invention, there is provided a terminal device that displays display information in a display section capable of performing three-dimensional display, comprising: a judgment means for judging suitability in three-dimensional display of the display information based on contents of the display information; a determination means for determining display control to be performed when the display information is displayed in the display section based on the suitability in three-dimensional display judged by the judgment means; and a display control means for displaying the display information in the display section in accordance with the display control determined by the determination means.

In accordance with another aspect of the present invention, there is provided a computer-readable storage medium having stored thereon a program that is executable by a computer, the program being executable by the computer to perform a process comprising: processing for judging suitability in three-dimensional display of display information based on contents of the display information when the display information is displayed in a display section capable of three-dimensional display; processing for determining display control to be performed when the display information is displayed in the display section based on the judged suitability in three-dimensional display; and processing for displaying the display information in the display section in accordance with the determined display control.

According to the present invention, when display information is displayed in a display section capable of three-dimensional display in a terminal device, a suitable display is actualized in accordance with the contents of the display information. Therefore, the present invention has excellent practicability.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a diagram for explaining a display control information storage section M3;

FIG. 5 is a diagram for explaining a display control information storage section M3 according to a second embodiment;

FIG. 7 is a diagram for explaining a content storage section M4 according to the second embodiment.

DETAILED DESCRIPTION OF THE PREFERRED EMBODIMENTS

The present invention will hereinafter be described in detail with reference to the preferred embodiments shown in the accompanying drawings.

(First Embodiment)

First, a first embodiment of the present invention will be described with reference to FIG. 1 to FIG. 4.

Figure 1:
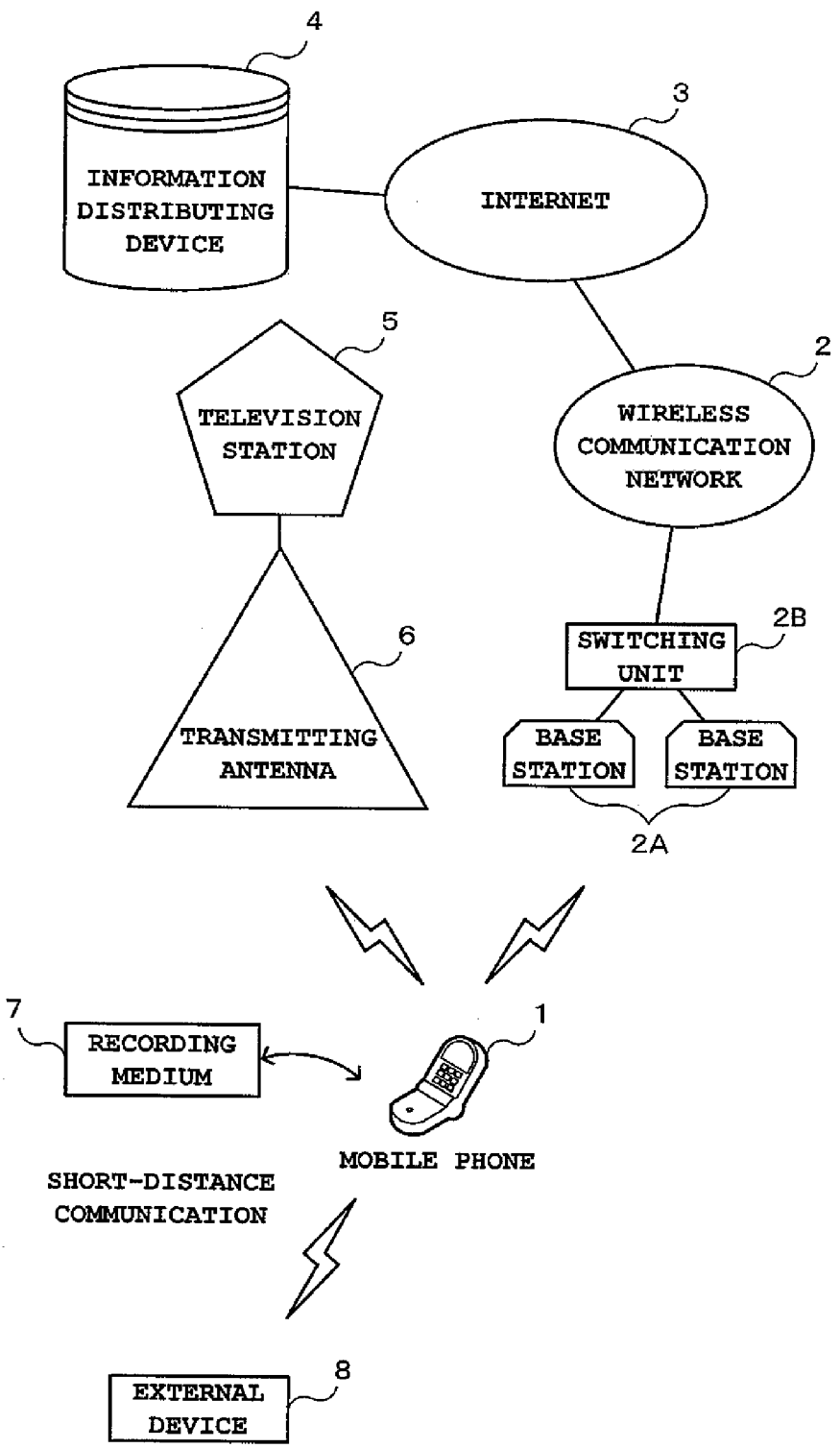
FIG. 1 is a block diagram showing a communication network system in which a mobile phone serving as a terminal device can be used.

The first embodiment is an example in a case where a mobile phone serves as a terminal device, and FIG. 1 is a block diagram of a communication network system in which this mobile phone can be used.

In FIG. 1, a mobile phone 1 provides a call function, an electronic mail function, an Internet connection function (web access function), and a camera function. In addition, the mobile phone 1 provides a television function for receiving and viewing digital television broadcasts (such as one segment terrestrial digital television broadcasts), a three-dimensional (3D) display function, etc. The 3D display function shows, using a parallax barrier method that takes advantage of binocular disparity between the left and right eyes, display information (contents) such as moving images, still images, text, and menus with 3D depth indicating the depth of 3D or the extent of outward projection, rather than showing them two-dimensionally (2D).

When the mobile phone 1 is connected to a wireless communication network (mobile communication network) 2 from the nearest base station 2A and switching unit 2B, a connection can be established between the mobile phone 1 and another mobile phone 1 via the wireless communication network 2. Also, when the mobile phone 1 is connected to the Internet 3 via the wireless communication network 2, websites can be accessed and viewed. In addition, multimedia contents such as moving images, still images, music, and news can be downloaded for streaming playback from an information distributing device 4 via the Internet 3 and the wireless communication network 2, and replayed.

The mobile phone 1 receives terrestrial digital broadcasts (broadcast contents) transmitted from a television station 5 through a transmitting antenna 6. However, as in the case of Internet radio, digital broadcasts can be downloaded and received from the information distributing device 4 via the wireless communication network 2 and the Internet 3. In addition to being capable of receiving broadcast contents via the television function and downloading streaming contents via the Internet connection function as just described, the mobile phone 1 is capable of acquiring various contents from a recording medium 7 such as a detachable portable memory card, and acquiring various contents from an external device such as another mobile phone by short-distance communication such as Bluetooth (registered trademark) communication and infrared communication.

Figure 2:
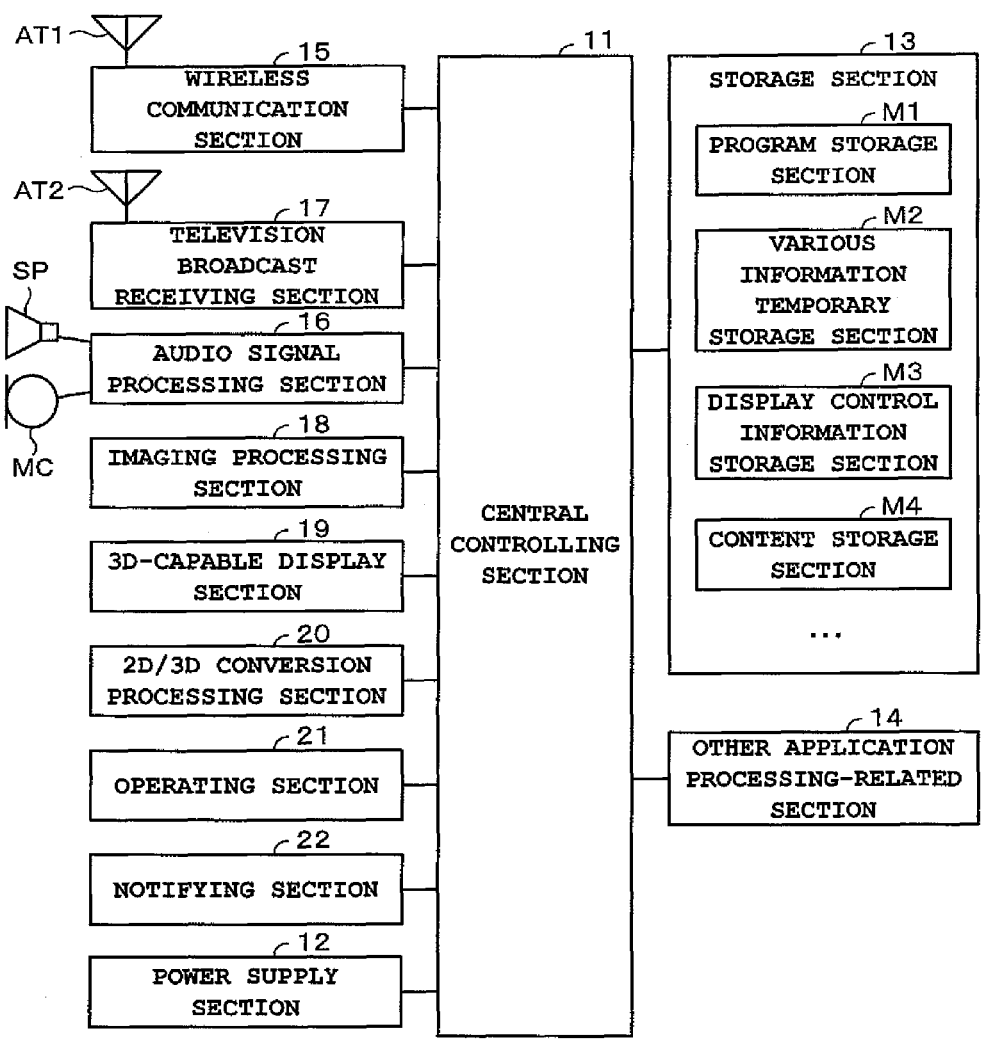
FIG. 2 is a block diagram showing basic components of a mobile phone 1.

FIG. 2 is a block diagram showing basic components of the mobile phone 1.

In FIG. 2, a central controlling section 11 operates using power supplied from a battery section 12 including a secondary battery, and includes a central processing unit, a memory, etc. The central processing unit controls overall operations of the mobile phone 1 based on various programs stored in a storage section 13, and this storage section 13 includes a program storage section M1, a various information temporary storage section M2, a display control information storage section M3, a content storage section M4 used in a second embodiment described hereafter, etc. The storage section 13 may be configured to include a detachable portable memory (recording medium) such as a secure digital (SD) card or an integrated circuit (IC) card. Also, the storage section 13 may be provided on a predetermined external server (not shown).

Here, the central controlling section 11 actualizes functions of a judgment means, a determination means, and a display control means.

Figure 4:
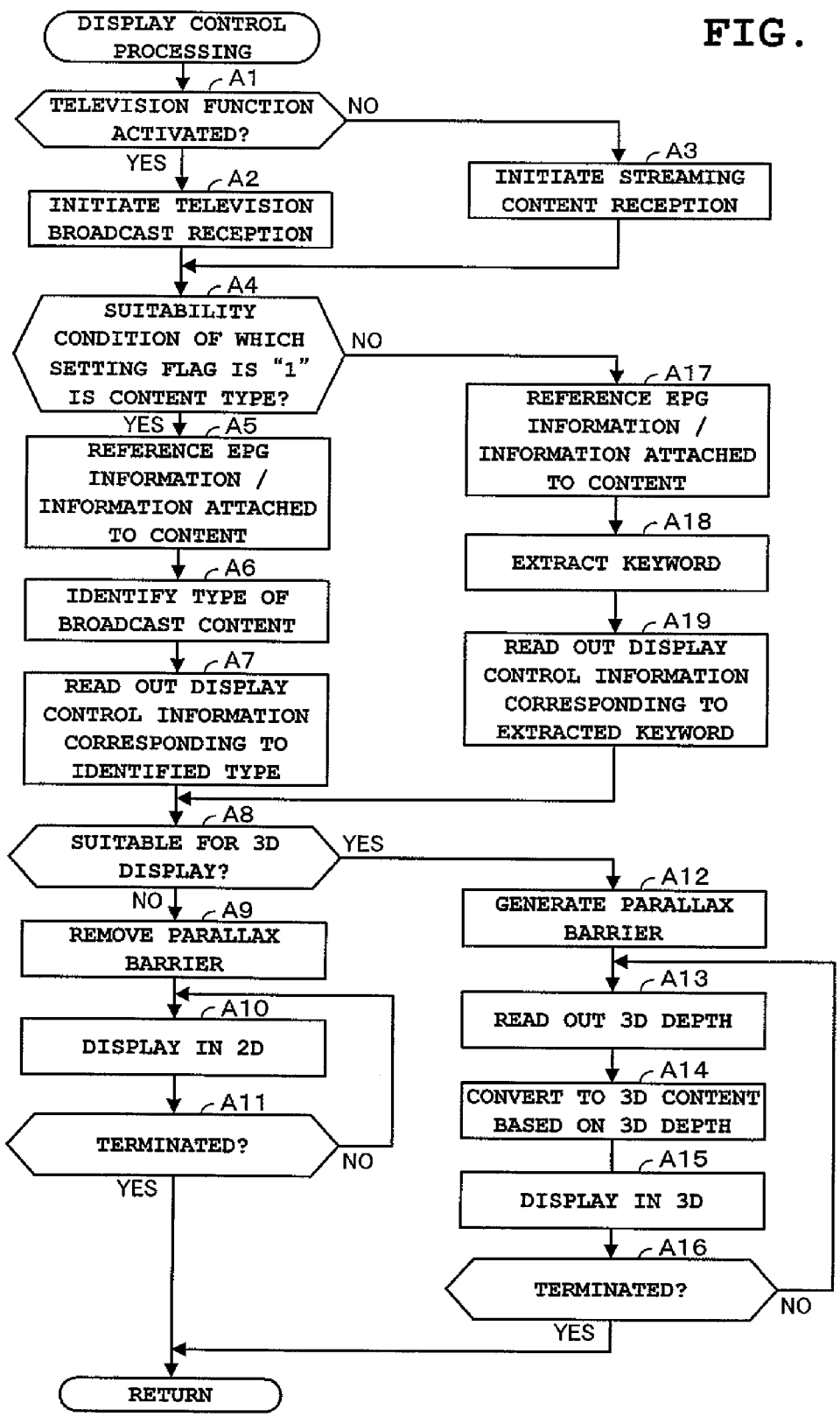
FIG. 4 is a flowchart showing a display control processing that is initiated by the activation of a television application of a television function or a viewer application of an Internet connection function.

The program storage section M1 stores therein programs, various applications, and the like for actualizing the embodiment according to operation procedures shown in FIG. 4. The program storage section M1 also stores therein information and the like required by the programs and applications. The various information temporary storage section M2 is a work area temporarily storing therein various information required for the operation of the mobile phone 1, such as flag information, timer information, and screen information. The display control information storage section M3 will be described in detail hereafter.

Another application processing-related section 14 stores information related to application processing of the electronic mail function, the Internet connection function, the camera function, the television function, and the like, and performs control related to these processing. A wireless communication section 15 (reception and playback means) includes a wireless section, a baseband section, a demultiplexing section, and the like, and exchanges data with the nearest base station 2A during the operation of, for example, the call function, the electronic mail function, or the Internet connection function. When the call function is running, the wireless communication section 15 receives signals from the receiving side of the baseband section, and after demodulating the signals into received baseband signals, outputs the received baseband signals from a call speaker SP as audio via an audio signal processing section 16. The wireless communication section 15 also receives, from the audio signal processing section 16, audio data inputted from a call microphone MC, and after encoding the audio data into transmission baseband signals, sends the encoded transmission baseband signals to the transmitting side of the baseband section, and transmits the encoded transmission baseband signals from an antenna AT1.

A television broadcast receiving section 17 (broadcast reception and output means), which includes a receiving section (analog circuit section) and a digital circuit section, constitutes the television function and is capable of receiving one segment terrestrial digital television broadcasts for communication terminal devices, as well as program information such as an electronic program guide (EPG information). The receiving section extracts broadcast signals of a pre-selected channel from television broadcast signals received by a television antenna AT2. The digital circuit section performs orthogonal frequency-division multiplexing (OFDM) demodulation on received broadcast signals, separates and decodes multiplexed broadcast signals into video, audio, and data (text data) signals, decompresses compressed data, etc.

An imaging processing section 18, which constitutes a camera function capable of shooting still images and moving images, includes a lens and mirror block including an imaging lens and a mirror, an image sensor and a drive system therefor, a distance sensor, a light quantity sensor, an analog processing circuit, a signal processing circuit, a compression/expansion circuit, and the like, and controls the adjustment of optical zoom, auto-focus and manual focus performed by user operation to adjust focus during shooting, the driving of the shutter, exposure, white balance, and the like.

A 3D-capable display section 19 (display section) uses high-definition liquid crystal to show display information (contents) such as text information, wallpaper images, television pictures, and captured images. A liquid crystal layer for generating a parallax barrier is provided on the front surface of this display section 19, thereby allowing 3D display. A 2D/3D conversion processing section 20 converts 2D content to content for the right eye and content for the left eye in accordance with 3D depth, converts 3D content to content having a different 3D depth, and converts 3D content to 2D content. The content converted by the 2D/3D conversion processing section 20 is displayed in the display section 19 in 2D or 3D. Note that the 2D/3D conversion processing section 20 and the central controlling section 11 actualize functions of a display control means.

An operating section 21 is used to perform dial-input, text-input, command-input, etc. The central controlling section 11 performs processing based on input operation signals from this operating section 21. Note that the operating section 21 and the central controlling section 11 actualize functions of a setting control means.

A notifying section 22, which includes a sound speaker, a light-emitting diode (LED) lamp, and a vibration motor (not shown), is driven when an incoming call is received and notifies of the incoming call. The notifying section 22 is also driven during alarm notification and the like.

FIG. 3 is a diagram for explaining the display control information storage section M3.

In FIG. 3, the display control information storage section M3 is configured to associate and store "suitability condition" and "display control information". "Suitability condition" is used to judge, based on the contents of content to be displayed in the display section 19, the suitability in 3D display of the content, and "display control information" indicates whether the content is to be displayed in the display section 19 in 2D or in 3D based on the judgment result. "Display control information" also indicates when the content is to be displayed in 3D, 3D depth (intensity) to be used for the display in accordance with the suitability level. The display control information storage section M3 also includes "setting flag" in addition to the "suitability condition" and the "display control information".

Here, "suitability in 3D display" refers to a plurality of judgment conditions that are categorized for determining which display mode, including 3D display mode and 2D display mode, is suitable for displaying targeted information in the display section 19.

Details of the display control information storage section M3 can be optionally set by user operation, and therefore some of the default details set in advance by the manufacturer can be changed by user operation. The central controlling section 11 references the display control information storage section M3 to judge the suitability in 3D display of content based on the contents of this content, and after determining the display control based on this suitability in 3D display, displays the content in the display section 19 in 2D or 3D in accordance with this display control. That is, "content type" serving as "suitability condition" indicates the type of whether the content is broadcast content received via the television function or content (streaming content) downloaded via the Internet connection function. In the example in FIG. 3, "animated program (animation program)", "action movie", "other movies", "weather forecast program", "stock market program", "go/shogi program", "commercial (CM)", and the like have been stored as "content type".

When content received as a display subject is broadcast content, the central controlling section 11 references the EPG information, or when content other than broadcast content is received, the central controlling section 11 references content-related information attached to the content, thereby determining the type of received content. Then, after determining the display control of the content based on the "display control information" associated with this type, the central controlling section 11 displays the content in the display section 19 in 2D or 3D in accordance with the display control. The above-described content-related information (content information) is information including, for example, a genre, a title, cast, and a description.

"Display control information" includes "2D/3D" that indicates whether content is to be displayed in 2D or in 3D, and "3D depth" that indicates in accordance with the suitability level the 3D depth (intensity) to be used when the content is displayed in 3D. "3D depth" indicates the depth of 3D or the extent of outward projection of content, and is set to "level 3", "level 2", "level 1" or "level 0". The relationship of these levels is, in the order of depth from strong depth (high resolution depth) to weak depth (low resolution depth), level 3>level 2>level 1>level 0. In "2D/3D" of the example in FIG. 3, "3D" indicating 3D display has been stored in association with "animated program", "action movie", and "other movies", and "2D" indicating 2D display has been stored in association with "weather forecast program", "stock market program", "go/shogi program", and "CM".

Also, in "3D depth", "level 2" indicating a medium 3D depth has been stored in association with "animated program", "level 3" indicating the most strongest 3D depth has been stored in association with "action movie", and "level 1" indicating the most weakest 3D depth has been stored in association with "other movies". "level 0" indicates that the 3D depth is at "level 0 (zero)" and the display information is in 2D (flat).

"Keyword" serving as "suitability condition" is used to judge whether or not content to be displayed corresponds to a predetermined keyword. In the example in FIG. 3, "sports", "soccer", "table tennis", "shogi", "martial arts", and the like have been stored. When received content is broadcast content, the central controlling section 11 references the EPG information, or when content other than broadcast content is received, the central controlling section 11 references the content information, such as the title, attached to the content, thereby determining whether or not received content corresponds to a predetermined keyword. Then, after determining the display control of this content based on the "display control information" associated with the corresponding keyword, the central controlling section 11 displays the content in the display section 19 in 2D or 3D in accordance with the display control.

"Display control information" includes, as in the case described above, "2D/3D" and "3D depth". In "2D/3D" of the example in FIG. 3, "2D" has been stored in association with "shogi". "3D" has been stored in association with "sports", "soccer", "table tennis", and "martial arts". In "3D depth", "level 3" has been stored in association with "soccer" and "martial arts". "Level 1" has been stored in association with "table tennis". Note that, in "3D depth" associated with "sports", "***" has been stored and indicating that the level differs depending on the type of sport. "Setting flag" indicates which of "content type" and "keyword" serving as "suitability condition" is the currently enabled condition, and is selectively set by user operation. In the example in FIG. 3, the "content type" of which the "setting flag" is "1" is the currently enabled "suitability condition".

Next, the operation concept of the mobile phone 1 according to the embodiment will be described with reference to the flowchart in FIG. 4.

Note that each function described in this flowchart is stored in a readable program code format, and operations in accordance with the program codes are sequentially performed. In addition, operations in accordance with the program codes transmitted from a transmission medium such as a network can also be sequentially performed. That is, operations unique to the embodiment can be performed using programs and data provided from an external source via a transmission medium besides a recording medium. Also note that FIG. 4 is a flowchart showing an operations outline for the characteristic portion of this embodiment from among all of the operations of the mobile phone 1. When the mobile phone 1 exits the flow in FIG. 4, it returns to the main flow (not shown) of the overall operation.

FIG. 4 is a flowchart showing display control processing that is initiated by the activation of a television application of the television function or a viewer application of the Internet connection function.

In FIG. 4, initially, when the television function is activated (YES at Step A1), the central controlling section 11 initiates the reception of broadcast content as content to be displayed, based on the operation of the television broadcast receiving section 17 (Step A2). Alternatively, when the Internet connection function is activated (NO at Step A1), the central controlling section 11 initiates the reception of streaming content as content to be displayed, based on the operation of the wireless communication section 15 (Step A3).

When broadcast content is received (Step A2), the central controlling section 11 references the display control information storage section M3, and judges whether or not the "suitability condition" of which the "setting flag" is "1" is "content type" (Step A4). When judged that the "suitability condition" is "content type" (YES at Step A4), the central controlling section 11 references EPG information (Step A5) to identify the type of the broadcast content (Step A6). In this case, the central controlling section 11 searches EPG information based on current time information and a reception channel to identify the program currently being broadcasted. However, if the reception channel is a commercial broadcasting channel and the current time corresponds to a commercial break between programs, the type of the broadcast content is identified as being "CM". Note that EPG information may be received and acquired upon the activation of the television broadcast receiving section 17 or acquired by periodic reception. Furthermore, EPG information may be acquired through the Internet connection function, an external medium, etc.

Then, the central controlling section 11 searches the display control information storage section M3 based on the identified content type, and after reading out the "display control information" associated with this "content type" (Step A7), examines whether or not the "2D/3D" is "3D", or in other words, whether or not the content is suitable for 3D display (Step A8). When the type of the broadcast content is "CM", "weather forecast program", or the like, since "2D" has been stored for these types in "2D/3D" (NO at Step A8), the central controlling section 11 judges that the content is not suitable for 3D display, and proceeds to processing for displaying the broadcast content in 2D. At this point, if a parallax barrier has been generated on the front surface of the display section 19, the broadcast content is displayed in the display section 19 in 2D (Step A10) after the parallax barrier is removed (Step A9). Then, until the termination of the television application is instructed (YES at Step A11), the central controlling section 11 receives and displays in 2D broadcast contents received and acquired from the television broadcast receiving section 17 (Step A10 and Step A11).

Alternatively, when the type of the broadcast content is "animated program", "action movie", or the like, since "3D" has been stored for these types in "2D/3D" (YES at Step A8), the central controlling section 11 judges that the content is suitable for 3D display, and after generating a parallax barrier in the front layer of the display section 19 (Step A12), reads the "3D depth" associated with this "content type" (Step A13). Here, when the type of the broadcast content is "animated program", the central controlling section 11 reads out a "3D depth" of "level 3". When the type of the broadcast content is "other movies", the central controlling section 11 reads out a "3D depth" of "level 1".

Then, following the processing in the 2D/3D conversion processing section 20 for converting the 2D broadcast content to content for the right eye and content for the left eye in accordance with the 3D depth, the central controlling section 11 proceeds to processing for displaying the broadcast content in the display section 19 in 3D. In this processing, the central controlling section 11 acquires the converted broadcast content (Step A14) and displays the broadcast content in the display section 19 in 3D with the read-out "3D depth" (Step A15). Then, until the termination of the television application is instructed (YES at Step A16), the central controlling section 11 receives and displays in 3D broadcast contents received and acquired from the television broadcast receiving section 17 (Step A13 to Step A16).

Conversely, when the "suitability condition" of which the "setting flag" is set to "1" is "keyword" (NO at Step A4), the central controlling section 11 searches EPG information based on the current time information and the reception channel (Step A17), and after extracting a keyword such as the genre, the title, and the cast from information on the program currently being broadcasted (Step A18), searches the display control information storage section M3 based on the extracted keyword, and reads out "display control information" associated with this "keyword" (Step A19). The central controlling section 11 then proceeds to Step A8 described above and judges whether or not "2D/3D" for this keyword has been set to "3D", or in other words, whether or not the content is suitable for 3D display. Here, when the keyword corresponding to the targeted broadcast content is "shogi", since "2D" has been stored for this keyword in "2D/3D" (YES at Step A8), the central controlling section 11 judges that the content is not suitable for 3D display and displays the broadcast content in 2D (Step A9 to Step A11) in a manner similar to that described above.

Alternatively, when the keyword corresponding to the broadcast content is "soccer" or "table tennis", since "3D" has been stored for this keyword in "2D/3D" (YES at Step A8), the central controlling section 11 judges that the content is suitable for 3D display, and after reading out the "3D depth", displays the broadcast content in 3D in a manner similar to that described above. At this time, the central controlling section 11 displays the broadcast content with the read-out "3D depth" after generating a parallax barrier in the front layer of the display section 17 (Step A12 to Step A16).

At Step A1, when the Internet connection function is activated (NO at Step A1), and streaming content is received from the wireless communicating section 15 as content to be displayed (Step A3), in this case also, the central controlling section 11 proceeds to Step A4 and the subsequent processing described above. However, at Step A5 and Step A17 described above, when broadcast content is received as content to be displayed, the central controlling section 11 identifies the content type by referencing EPG information or extracts a keyword. In the case just described where streaming content is received from the wireless communicating section 15, the central controlling section 11 determines the content type or extracts a keyword by referencing the content information (information including the genre, the title, the cast, a description, etc.) attached to the streaming content. Then, the central controlling section 11 references the display control information storage section M3, and after judging whether or not the "suitability condition" of which the "setting flag" is "1" is "content type" (Step A4), proceeds to the processing based on "content type" (Step A5 to Step A16), or the processing based on "keyword" (Step A17 to Step A19, and Step A8 to Step A16) in a manner similar to that described above.

As described above, in the first embodiment, when displaying content in the display section 19 capable of 3D display, the central controlling section 11 judges the suitability in 3D display of the content based on the contents of this content, and displays the content in the display section 19 in accordance with display control determined based on the suitability in 3D display. Therefore, an excellent practicability can be achieved in that a suitable display ranging from an easy-to-view 2D display to a realistic 3D display can be actualized based on the contents of content and an advantage in terms of power consumption can be obtained.

Also, in the first embodiment, since control is performed regarding whether content is to be displayed in 2D or in 3D based on the suitability in 3D display of the content, 2D display and 3D display can be appropriately switched based on the contents of content.

In addition, since 3D display is performed by 3D depth indicating the depth of 3D or the extent of outward projection being determined based on suitability in 3D display, 3D depth can be controlled based on the contents of content.

Moreover, since 3D depth is determined in accordance with the level of suitability in 3D display, content more suitable for 3D display can be displayed with a stronger 3D depth.

Furthermore, since the suitability in 3D display of content is judged based on the type of the content, a realistic 3D display can be actualized based on the type of content. For example, programs in a predetermined genre (such as a nature program) can be displayed in 3D. Also, for example, when the type of content is animation, animation is displayed in 3D. Therefore, a realistic, effective display of animation can be realized.

Still further, since the suitability in 3D display of content is judged based on whether or not content corresponds to a predetermined keyword, a realistic 3D display can be actualized based on the keyword. For example, broadcast programs in a predetermined genre and the like can be displayed in 3D.

Yet still further, since the suitability conditions for judging suitability in 3D display can be selectively set by user operation, a realistic 3D display can be actualized based on user preference. For example, broadcast programs in user's intended genre and the like can be displayed in 3D.

Yet still further, when a broadcast program is received to be outputted in real-time, the suitability in 3D display of the broadcast program is judged with reference to EPG. Therefore, the judgment can be easily made even when content is outputted in real-time.

Yet still further, when streaming content is received via the Internet to be replayed in real-time, the suitability in 3D display is judged with reference to the content information related to the streaming content. Therefore, the judgment can be easily made even when content is outputted in real-time.

Note that, in the above-described first embodiment, contents not suitable for 3D display are displayed in 2D. However, the contents may be displayed in 3D with weak 3D depth (such as level 1) instead of being displayed in 2D.

Also, in the above-described first embodiment, some of the default details in the display control information storage section M3 which are set in advance by the manufacturer can be changed by user operation. However, the setting of the display control information storage section M3 may be done only by user operation. In this case, the configuration may be such that, whether the display control information storage section M3 has been set or not is judged, and when it is judged as not having been set, 2D display is performed if broadcast content is a CM, and 3D display is performed if broadcast content is an animation.

Moreover, in the above-described first embodiment, the suitability in 3D display of content is judged based on the type of the content. Also, alternatively, the suitability in 3D display of content is judged based on whether or not the content corresponds to a predetermined keyword. However, the suitability in 3D display of content may be judged based on a combination of the type and the keyword. This judgment based on a combination of the type and the keyword actualizes a more specific judgment.

Furthermore, in the above-described first embodiment, television broadcast contents and streaming contents downloaded via a network are given as examples of content. However, the content is not limited thereto. The content may be accumulated content such as recorded (image-recorded, sound-recorded) broadcast contents and downloaded contents, contents provided from an external source such as a memory card, and contents captured and stored by the camera function.

Still further, in the above-described first embodiment, when broadcast content is received to be outputted in real-time, the suitability in 3D display of the broadcast content is judged with reference to EPG. However, in an environment capable of receiving 3D broadcast contents in addition to 2D broadcast contents, the suitability in 3D display of broadcast content may be judged with reference to a flag identifying that the broadcast is in 3D.

(Second Embodiment)

Next, a second embodiment of the present invention will be described with reference to FIG. 5 to FIG. 8.

In the above-described first embodiment, when broadcast content or the like is received to be outputted, the suitability in 3D display of the content is judged based on the content type or whether or not the content corresponds to a keyword set by the user in advance. However, in the second embodiment, before content stored (accumulated) in advance, such as television broadcast content received and recorded or content captured and stored by a camera, is displayed in the display section 19, the contents of the content is analyzed, and the suitability in 3D display of the content is judged based on the result of the analysis.

Also, in the above-described first embodiment, when broadcast content and the like is received to be outputted, the content is converted from 2D to 3D and then outputted. However, in the second embodiment, a plurality of contents having the same contents with various 3D depths are prepared, and content with a predetermined 3D depth is selected from the plurality of contents to be displayed in 3D. When content having the predetermined 3D depth has not been prepared, in the second embodiment as well, the 2D content is converted to content having the predetermined 3D depth and displayed in 3D in a manner similar to that in the first embodiment.

The mobile phone 1 according to the second embodiment includes a content recording function in addition to the television function, the Internet connection function, the camera function, etc. The content recording function is an image-recording and sound-recording function that records images and sounds such as broadcast contents received by the television function, various contents downloaded by the Internet connection function, and imaged contents acquired by the camera function. Note that sections that are basically the same or having the same name in both embodiments are given the same reference number, and explanations thereof are omitted. Hereafter, the second embodiment will be described focusing on characteristic portions thereof.

FIG. 5 is a diagram for explaining the display control information storage section M3 according to the second embodiment.

In FIG. 5, as in the case of the above-described first embodiment, the display control information storage section M3 includes "setting flag" in addition to "suitability condition" and "display control information". The details can be set optionally by user operation, and therefore some of the default details set in advance by the manufacturer can be changed by user operation. In the second embodiment, "suitability condition" refers to a condition for judging whether or not content is suitable for 3D display based on an analysis result of the contents of the content. "Suitability condition" includes "analysis criterion" and "analysis result".

"Analysis criterion" includes "luminosity", "color", and "movement" as criteria of the analysis of the contents of the content. "Luminosity" indicates the level of variation (deviation) in image luminosity, "Color" indicates the level of variation (deviation) in color, and "Movement" indicates the level of changes in movement. "Setting flag" indicates the currently valid criterion among the above-described "luminosity", "color", and "movement", and this is selectively set by user operation. In the FIG. 5 example, the "luminosity" of which the "setting flag" is "1" is indicated as the currently valid "analysis criterion".

"Analysis result" indicates the level of variation in luminosity, the level of changes in movement, and the level of variation in color. The central controlling section 11 performs, for analyzing the level of variation in luminosity, the level of changes in movement, or the level of variation in color, any of an overall analysis for analyzing the overall content to be displayed, a periodic analysis for performing analysis on content at a fixed timing, and a partial analysis for analyzing a portion of content. The central controlling section 11 then judges the suitability in 3D display of this content by referencing the display control information storage section M3 based on the analysis result. When the content is suitable for 3D display, the content is displayed in the display section 19 in 3D. In the example in FIG. 5, "low variation", "medium variation", and "high variation" are stored in association with "luminosity". Also, "low variation", "medium variation", and "high variation" are stored in association with "color". Moreover, "zero movement (still image)", "slight movement (moving image)", and "substantial movement (moving image)" are stored in association with "movement".

Figure 6A:
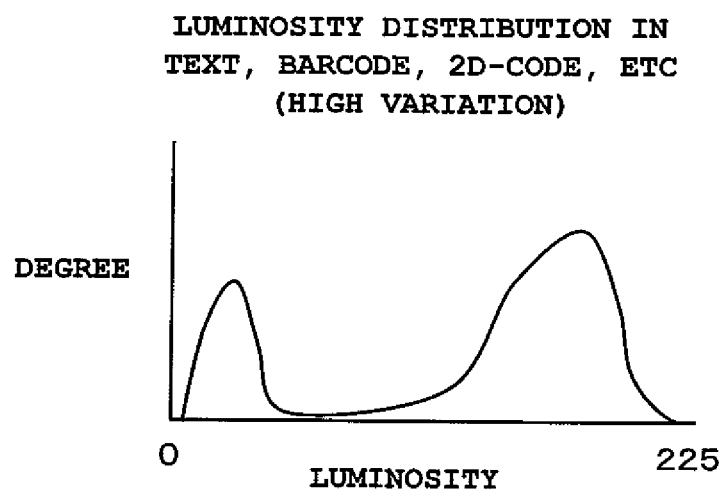
FIG. 6A is an example of luminosity distribution when the content is a text, a barcode, a two-dimensional code, or the like in the second embodiment.
Figure 6B:
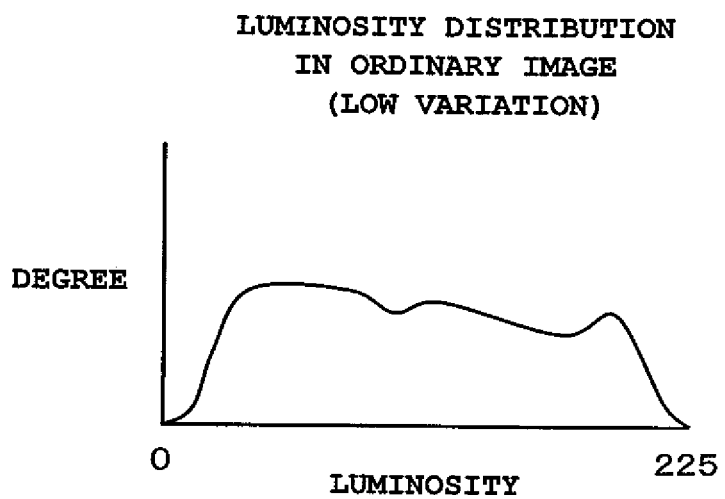
FIG. 6B is a diagram showing an example of luminosity distribution when the content is an ordinary image in the second embodiment.

"Display control information" includes "2D/3D" and "3D depth". The central controlling section 11 displays broadcast content in 2D or 3D depending on the "display control information" associated with the "analysis criterion" for "luminosity". FIG. 6A is an example of luminosity distribution when content is a text, a barcode, a two-dimensional code, or the like. FIG. 6B is an example of luminosity distribution when content is an ordinary image. As shown in FIG. 6A, when variation in luminosity is high, the content is displayed in 2D because suitability for 3D display is not suitable. As shown in FIG. 6B, when variation in luminosity is low, the content is displayed with a strong 3D depth because suitability for 3D display is good.

When movement in the content is substantial (significant), the 3D depth is increased because suitability for 3D display is good. When movement in the content is slight (insignificant), the 3D depth is decreased because suitability for 3D display is poor. When color variation in the content is high, the 3D depth is increased because suitability for 3D display is good. When color variation in the content is low, 3D depth is decreased because suitability for 3D display is poor.

In the example in FIG. 5, when "luminosity" is "high variation", "movement" is "zero movement (still image)", and "color" is "low variation", the content is not suitable for 3D display. Therefore, "2D" has been stored in the corresponding "2D/3D", and "level 0" has been stored in the corresponding "3D depth". Others are suitable for 3D display, and therefore "3D" has been stored. Also, "level 1" has been stored in "3D depth" of which the "luminosity" is "medium variation", the "movement" is "slight movement (moving image)", and the "color" is "medium variation", and "level 3" has been stored in "3D depth" of which the "luminosity" is "low variation", the "movement" is "substantial movement (moving image)", and the "color" is "high variation".

FIG. 7 is a diagram for explaining the content storage section M4.

The content storage section M4 stores therein display information (content) to be displayed in the display section 19. For example, information, such as moving images, still images, music, and news, downloaded via the Internet 3 and the wireless communication network 2 from the information distributing device 4, and information that are broadcast programs received by the television receiving section 17 and recorded are stored as contents. This content storage section M4 is configured to store therein "title", "type", "actual data", "3D depth", and the like in association with "information identifier (ID)" that identifies content. "Title" indicates a title related to the contents of content, and in the example in FIG. 7, it includes "two-dimensional code", "field day 2008", "J-League match", "sample moving image", "sample still image**", and the like. "Type" is type information indicating whether the content is moving image content or still image content.

"Actual data" refers to actual data of content. Some contents only have actual data of which the "3D depth" is "level 0 (2D display)", while other contents may have actual data with each 3D depth. That is, some contents have actual data for each 3D depth (including for 2D display) although the contents are the same, and other contents only have actual data of which the 3D depth is "level 0 (2D)". "Level 0 (2D)" indicates that 3D depth is "level 0 (zero)" and is 2D (flat).

As just described, a plurality of contents having the same contents with various 3D depths is prepared. The central controlling section 11 selects content with a predetermined 3D depth from among the plurality of contents, and after reading out the "actual data" from the content storage section M4, displays the "actual data" in the display section 19 in 3D. Regarding content having a 3D depth that is not stored in the content storage section M4, 2D content having the same contents is converted to content with the predetermined 3D depth and the converted content is displayed in 3D.

In the FIG. 7 example, when the "title" of content is "two-dimensional code" or "field day 2008", then the "type" is "still image", the "actual data" is "2D", and the "3D depth" is "level 0". Also, when the "title" of content is "J-League match", then the "type" is "moving image", the "actual data" is "3D", and the "3D depth" is "level 1". When the "title" of content is "sample moving image", then the "type" is "moving image", and the "actual data" is 3D data with "level 1" and 3D data with "level 2" for a plurality of "3D depths". When the "title" of content is "sample still image**", then the "type" is "still image", the "actual data" is 3D data with "level 1", 3D data with "level 2", and 3D data with "level 3" for a plurality of "3D depths".

Figure 8:
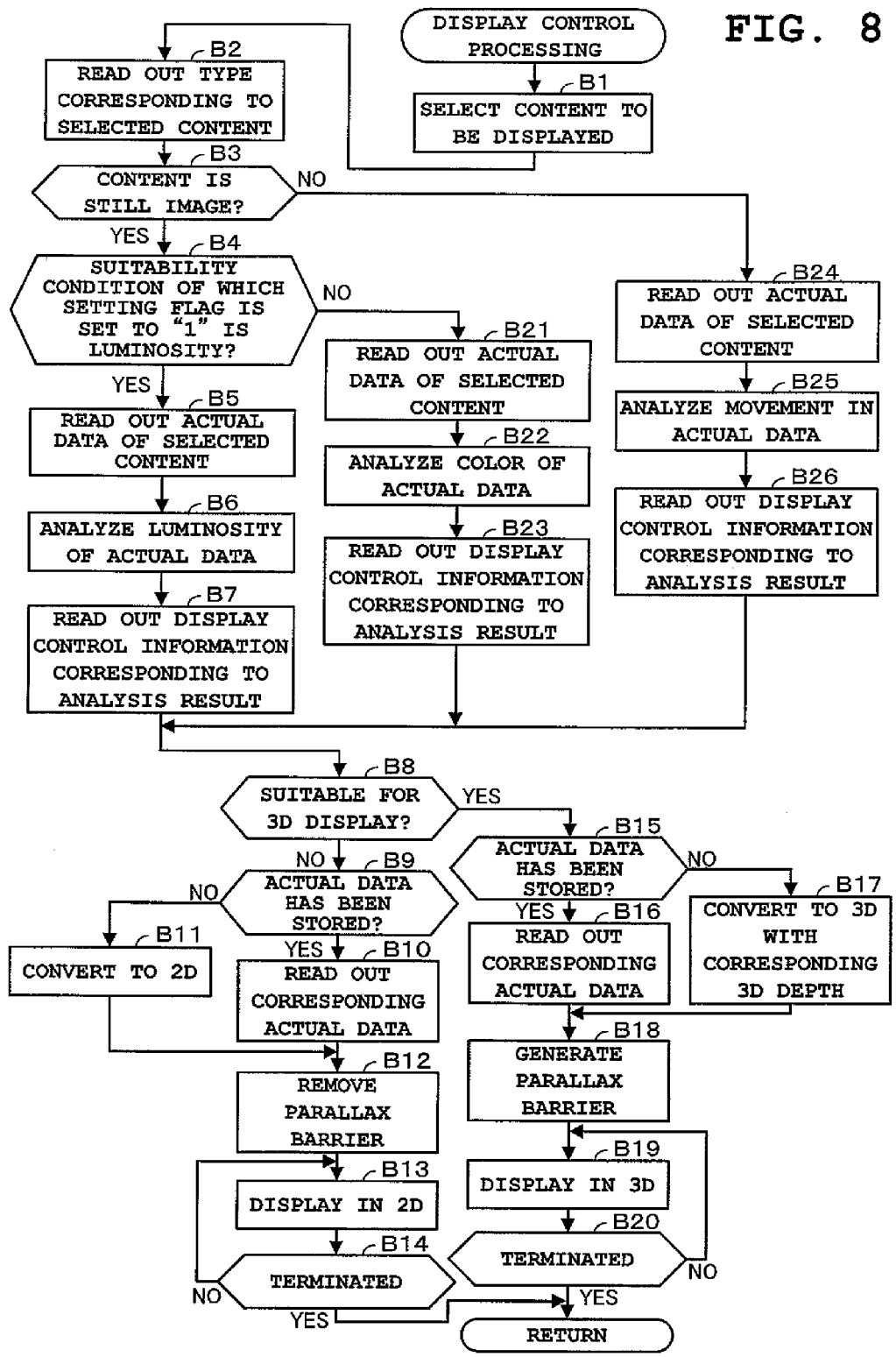
FIG. 8 is a flowchart showing display control processing for displaying targeted contents which is initiated by the activation of a viewer application for displaying accumulated contents.

FIG. 8 is a flowchart showing display control processing for displaying targeted contents which is initiated by the activation of a viewer application for displaying accumulated contents.

First, the central controlling section 11 displays "titles" in the content storage section M4 in a list. Then, when an intended content is selected from the list as a display subject by user operation (Step B1), the central controlling section 11 references the content storage section M4, and after reading out the "type" corresponding to the selected content (Step B2), judges whether or not the content is a still image (Step B3).

When judged that the content selected as a display subject is a still image (YES at Step B3), the central controlling section 11 judges whether or not the "suitability condition" of which the "setting flag" is "1" is "luminosity" (Step B4). When judged that the "suitability condition" is "luminosity" (YES at Step B4), the central controlling section 11 references the content storage section M4 and reads out the "actual data" of the content selected as a display subject (Step B5). In this instance, the central controlling section 11 read out, for example, the "actual data" of which the "3D depth" is "level 0" as the "actual data" of the selected content, and analyzes the image luminosity of the "actual data" (Step B6). Here, the level of variation in the luminosity is determined by any of the overall analysis, the periodic analysis, and the partial analysis of the "actual data". Then, the central controlling section 11 references the display control information storage section M3 based on the analysis result and judges whether or not the "2D/3D" is "3D", or in other words, judges whether or not the content is suitable for 3D display (Step B8).

Here, when the "analysis result" of the "luminosity" is "high variation", the "2D/3D" is "2D", and therefore the central controlling section 11 judges that the content is not suitable for 3D display (NO at Step B8), and after searching the content storage section M4, if "actual data" in 2D has been stored (YES at Step B9), reads out this "actual data" (Step B10). If "actual data" in 2D has not been stored (NO at Step B8), the central controlling section 11 converts "actual data" in 3D to actual data in 2D by the 2D/3D conversion processing section 20 (Step B11). Note that the "actual data" with the weakest depth (closest to 2D) may be selected from among a plurality of "actual data" with different 3D depths, and converted to 2D data. Next, the central controlling section 11 proceeds to processing for performing 2D display. At this point, if a parallax barrier has been generated on the front surface of the display section 19, the central controlling section 11 displays the content in the display section 19 in 2D (Step B13) after removing the parallax barrier (Step B12). Hereafter, until the termination of the content display is instructed (YES at Step B14), the central controlling section 11 displays the selected content in 2D (Step B13 and Step B14). In this way, when the "analysis result" is "high variation", the selected content is displayed in 2D.

For example, when the "analysis result" of the "luminosity" is "low variation" or "medium variation", the "2D/3D" is "3D" (YES at Step B8), and therefore the central controlling section 11 searches the content storage section M4 based on the corresponding "3D depth" and judges whether or not "actual data" in 3D corresponding to the "3D depth" is present (Step B15). Note that some contents only have actual data of which the "3D depth" is "level 0" while other contents have "actual data" with each 3D depth. When "actual data" in 3D that corresponds to the "3D depth" has been stored (YES at Step B15), the central controlling section 11 reads out this "actual data" (Step B16), and after generating a parallax barrier in the front layer of the display section 19 (Step B18), proceeds to processing for performing 3D display, and displays the "actual data" in the display section 19 in 3D (Step B19). Hereafter, until the termination of the content display is instructed (YES at Step B20), the central controlling section 11 displays the selected content in 3D (Step B19 and Step B20). In this way, when the "analysis result" is "low variation", the selected content is displayed in 3D with a depth of "level 3". Also, when the "analysis result" is "medium variation", the selected content is displayed in 3D with a depth of "level 1".

When "actual data" in 3D that corresponds to the "3D depth" has not been stored (NO at Step B15) or, in other words, only "actual data" with a 3D depth (such as the depth "level 0") other than the 3D depth in accordance with the analysis result of the "luminosity" has been stored, the 2D/3D conversion processing section 20 converts the "actual data" with this other 3D depth to content having the 3D depth in accordance with the analysis result (Step B17). Then, as in the case described above, after generating a parallax barrier in the front layer of the display section 19 (Step B18), the central controlling section 11 displays the content in the display section 19 in 3D (Step B19). Hereafter, until the termination of the content display is instructed (YES at Step B20), the central controlling section 11 displays the selected content in 3D (Step B19 and Step B20).

Conversely, at Step B4, when the "suitability condition" of which the "setting flag" is "1" is "color" (NO at Step B4), the central controlling section 11 references the content storage section M4, and after reading out the "actual data" of the content selected as the display subject (Step B21), analyzes the color variation in the "actual data" (Step B22). In this instance, the level of the color variation is determined by any of the overall analysis, the periodic analysis, and the partial analysis of the "actual data". Next, the central controlling section 11 references the display control information storage section M3 based on the analysis result and reads out "display control information" associated with this "analysis result" (Step B23). Then, as in the case described above, the central controlling section 11 proceeds to Step B8, and after judging whether or not the "2D/3D" is "3D", proceeds to processing for when "2D/3D" is "2D" (Step B9 to Step B14) or processing for when "2D/3D" is "3D" (Step B15 to Step B20). As a result, when the "analysis result" is "low variation", the selected content is displayed in 2D, and when the "analysis result" is "medium variation", the selected content is displayed in 3D with a depth of "level 1". When the "analysis result" is "high variation", the selected content is displayed in 3D with a depth of "level 3".

At Step B3, when the content selected as a display subject is a moving image (NO at Step B3), the central controlling section 11 references the content storage section M4, and after reading out the "actual data" of the content selected as a display subject (Step B24), analyzes the movement in the "actual data" (Step B25). In this instance, the level of the movement of an image is determined by any of the overall analysis, the periodic analysis, and the partial analysis of the "actual data". Next, the central controlling section 11 references the display control information storage section M3 based on the analysis result and reads out "display control information" associated with this "analysis result" (Step B26). Then, as in the case described above, the central controlling section 11 proceeds to Step B8, and after judging whether or not the "2D/3D" is "3D" proceeds to processing for when "2D/3D" is "2D" (Step B9 to Step B14) or processing for when "2D/3D" is "3D" (Step B15 to Step B20). As a result, when the "analysis result" is "zero movement (still image)", the selected content is displayed in 2D, and when the "analysis result" is "slight movement", the selected content is displayed in 3D with a depth of "level 1". When the "analysis result" is "substantial movement", the selected content is displayed in 3D with a depth of "level 3".

As described above, in the second embodiment, the suitability in 3D display of content is judged based on an analysis result of the contents of the content. Therefore, the suitability in 3D display of any content, such as an image captured by the camera function, can be judged based on the contents thereof.

Specifically, the following effects can be obtained.

In the second embodiment, the suitability in 3D display of content is judged based on an analysis result of the luminosity variation level of the content. Therefore, for example, when the luminosity variation is high, the content can be judged to be a text content such as text information, and displayed in 2D.

Also, the suitability in 3D display of content is judged based on an analysis result of the color variation level of the content. Therefore, for example, whether or not the color variation is similar to that of a captured image showing natural objects can be analyzed, and when the variation is similar to that of the natural objects, the content can be judged to be suitable for 3D display. In this case, the 3D depth can be increased.

Moreover, the suitability in 3D display of content is judged based on an analysis result of the movement level of the content. Therefore, for example, when the movement is large, the content can be judged to be suitable for a more realistic display, and the 3D depth can be increased.

Furthermore, content not suitable for 3D display can be displayed in 3D with weak 3D depth (such as level 0). Therefore, pseudo-2D display can be achieved by 3D display with a 3D depth of level 0.

In the above-described second embodiment, when luminosity variation in content is large, the content is judged to be a text content such as text information, and is displayed in 2D. However, the text content may be displayed with weak 3D depth (such as level 1).

Also, in the above-described second embodiment, when "actual data" with a determined 3D depth has not been stored, the actual data is converted to actual data with the determined 3D depth. However, a request for actual data with the determined 3D depth may be made to the information distributing device 4 to receive actual data with the determined 3D depth.

Moreover, in the above-described second embodiment, when content to be displayed is a still image, the suitability in 3D display of the content is judged based on an analysis result of the luminosity variation level of the content, or on an analysis result of the color variation level of the content. However, the suitability in 3D display of the content may be judged based on the luminosity variation level and the color variation level. In addition, when content to be displayed is a moving image, the suitability in 3D display of the content is judged based on an analysis result of the movement level of the content. However, as in the case of the still image, the suitability in 3D display of the content may be judged based on the luminosity variation level and/or the color variation level.

Furthermore, in each of the above-described embodiments, as an example method for performing 3D display of 3D content, a method is described in which content for the right eye and content for the left eye in accordance with the 3D depth of 3D content are simultaneously displayed, and a parallax barrier in accordance with the 3D depth is generated in the front layer of the display section 19 to allow the content to be correctly viewed in 3D. However, an optional 3D display method may be used such as a method for performing 3D display by applying a visual effect that makes content appear three-dimensional.

Still further, the storage section 13 may be an optional external storage device such as a memory card or an external hard disk, and the display section 19 may be an optional external display device such as an external monitor. In addition, the terminal device is not limited to the mobile phone 1 and may be an optional terminal device such as a personal computer, a personal digital assistant (PDA), a digital camera, or a music player. Moreover, the terminal device is not limited to a folding-type, and an optional casing structure such as a straight-type, a sliding-type, and a rotating-type may be used.

Yet still further, the "devices" or the "units" described in each of the above-described embodiments are not required to be in a single casing, and may be separated into a plurality of casings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A terminal device including a display section capable of performing three-dimensional display, comprising:
    an acquisition means for acquiring content to be displayed;
    storage configured to store first criteria for judging suitability for three-dimensional display of acquired content based on a program genre associated with the acquired content and second criteria for determining depth of three-dimensional display based on the program genre associated with the acquired content;
    a judgment means for judging suitability for three-dimensional display of the acquired content based on the program genre associated with the acquired content and the first criteria stored in the storage;
    a determination means for determining a depth of three-dimensional display in accordance with the judged suitability for three-dimensional display and the second criteria stored in the storage; and
    a display control means for three-dimensionally displaying the acquired content in a display section in accordance with the determined depth of three-dimensional display.

2. The terminal device according to claim 1, wherein:
    the suitability for three-dimensional display is further categorized by a plurality of judgment conditions for determining whether three-dimensional display mode or two-dimensional display mode is suitable for displaying the acquired content in the display section; and
    the storage is configured to store the judgment conditions.

3. The terminal device of claim 2, wherein the judgment conditions include luminosity, color, and/or movement of the acquired content.

4. The terminal device according to claim 1, wherein:
the judgment means judges a level of suitability when the acquired content is to be three-dimensionally displayed, based on the first criteria, and
the determination means determines the depth of three-dimensional display in accordance with the judged level of suitability and the second criteria.

5. The terminal device according to claim 1, wherein the determination means determines weak depth as the depth of three-dimensional display, based on the second criteria, when the judgment means judges that the acquired content is not suitable for three-dimensional display.

6. The terminal device according to claim 1, wherein:
the storage is configured to store third criteria for judging suitability for three-dimensional display based on keywords;
the acquired content comprises broadcast content and the acquisition means comprises a broadcast reception means for receiving broadcast content, the device further comprising:
an electronic program guide reception means for receiving electronic program guide information referring to contents of broadcast programs; and
a keyword extraction means for extracting a keyword from the received electronic program guide information of a broadcast program corresponding to the received broadcast content,
wherein:
the judgment means judges suitability in three-dimensional display of the received broadcast content based on the extracted keyword and the third criteria.

7. The terminal device of claim 6, wherein the third criteria comprise third correlations between keywords and display mode as two-dimensional or three-dimensional.

8. The terminal device according to claim 1, wherein the acquired content comprises broadcast content and the acquisition means comprises a broadcast reception means for receiving broadcast content, the device further comprising:
an electronic program guide reception means for receiving electronic program guide information referring to contents of broadcast programs;
wherein the judgment means identifies the program genre associated with the broadcast content with reference to the received electronic program guide and judges suitability in three-dimensional display of the received broadcast content based on the identified program genre associated with the broadcast content and the first criteria.

9. The terminal device of claim 8, wherein the third criteria comprise a third correlation between keywords and display mode as two-dimensional or three-dimensional.

10. The terminal device according to claim 1, wherein:
the content comprises streaming content and the acquisition means comprises a streaming content acquisition means for acquiring streaming content via a network, and
the judgment means identifies the program genre associated with the streaming content based on content-related information attached to the acquired streaming content and judges suitability for three-dimensional display of the acquired streaming content based on the identified program genre associated with the streaming content and the first criteria.

11. The terminal device according to claim 2, further comprising:
an analysis means for analyzing the contents of the display information;
wherein the judgment means judges suitability for three-dimensional display of the display information based on an analysis result from the analysis means and the judgment conditions.

12. The terminal device according to claim 1, wherein:
the storage is configured to store third criteria for judging suitability for three-dimensional display based on keywords; and
the content comprises streaming content and the acquisition means comprises a streaming content acquisition means for acquiring streaming content via a network, the device further comprising:
a keyword extraction means for extracting a keyword from content-related information attached to the acquired streaming content,
wherein the judgment means judges suitability in three-dimensional display of the acquired streaming content based on the extracted keyword and the third criteria.

13. The terminal device of claim 1, wherein:
the first criteria comprise first correlations between the program genre associated with the acquired content and display mode as two-dimensional or three-dimensional display; and
the second criteria comprise second correlations between the program genre associated with the acquired content and depth of three-dimensional display.

14. The terminal device of claim 1, wherein the program genre comprises one from among the group consisting of: an animated program, an action movie, other movies, a weather forecast program, a stock market program, a go/shogi program and a commercial.

15. A non-transitory computer-readable storage medium having stored thereon a program executable by a computer to perform a process comprising:
acquisition processing for acquiring content to be displayed;
storage to store first criteria for judging three dimensional display based on a program genre associated with the acquired content and second criteria for determining depth of three-dimensional display based on the program genre associated with the acquired content;
judgment processing for judging suitability for three-dimensional display of the acquired content based on the program genre associated with the acquired content and the first criteria;
determination processing for determining a depth of three-dimensional display in accordance with the judged suitability in three-dimensional display and the second criteria; and
display control processing for three-dimensionally displaying the acquired content in a display section in accordance with the determined depth of three-dimensional display.

16. The non-transitory computer-readable storage medium of claim 15, comprising a detachable portable memory, a secure digital (SD) card, and/or an integrated circuit (IC) card to store the program.

* * * * *